United States Patent [19]
Peri

[11] Patent Number: 6,088,525
[45] Date of Patent: Jul. 11, 2000

[54] LOOP PROFILING BY INSTRUMENTATION

[75] Inventor: Ramesh V. Peri, Richardson, Tex.

[73] Assignee: Hewlett-Packard Company, Palo Alto, Calif.

[21] Appl. No.: 08/878,958

[22] Filed: Jun. 19, 1997

[51] Int. Cl.[7] ................................. G06F 9/44
[52] U.S. Cl. ................ 395/704; 395/709; 714/35; 714/38; 712/241; 712/234; 712/233
[58] Field of Search .................... 395/704, 709, 395/183.11, 183.14, 588, 581, 580; 714/35, 38; 712/241, 234, 233

[56] References Cited

U.S. PATENT DOCUMENTS

| | | | |
|---|---|---|---|
| 4,991,088 | 2/1991 | Kam | 395/709 |
| 5,202,995 | 4/1993 | O'Brien | 395/709 |
| 5,664,191 | 9/1997 | Davidson et al. | 395/670 |
| 5,704,053 | 12/1997 | Santhanam | 395/383 |
| 5,758,061 | 5/1998 | Plum | 395/183.11 |
| 5,790,858 | 8/1998 | Vogel | 395/704 |

*Primary Examiner*—Tariq R. Hafiz
*Assistant Examiner*—Tuan Q. Dam

[57] ABSTRACT

The inventive system and method prepares a loop within a section of program code for profiling by placing instrumentation slots into the section at particular points. Entry slots are inserted just prior to the entry point of the loop. If there is a target within the loop of a branch instruction that is located outside of the loop, then the target is changed to point to the first instruction of the entry slots. If there is a fall through within the loop to the entry slots, then a branch instruction is inserted before the first instruction of the entry slots to branch around the entry slots. Exit slots are inserted immediately subsequent to the implicit exit point of the loop, and exit slots are also inserted just prior to the target of the explicit exit instruction. If there is a fall through within the section to the exit slots, then a branch instruction is inserted before a first instruction of the exit slots to branch around the exit slots. The target of the explicit exit instruction is changed to point to the first instruction of the exit slots.

46 Claims, 5 Drawing Sheets

LOOP PROFILING BY INSTRUMENTATION

BACKGROUND OF THE INVENTION

Compilers convert a source program that is usually written in a high level language into low level object code, which typically consists of a sequence of machine instructions or assembly language. The constructs in the source program are converted into a sequence of assembly language instructions. To achieve the highest possible efficiency of operation, it is essential to know exactly how much time the program takes to execute. In order to concentrate on those parts of the program that need improvements in efficiency, the length of time that the program takes to execute, and other statistics about the program execution, at the function level, at the loop level, and at the basic block level must be determined.

The prior art technique uses a profiler to collect information about loops. However, it can only handle loops that are single entry loops and which do not have multiple entry points. Moreover, the prior art profiler cannot handle loops which have nested loops. Also, it had problems with nested loops and loops that have multiple entry points. Collecting information about these types loops is very important because these loops form a major part of a high level programs, and determining exactly how long each loop takes to execute, as well as other characteristics, such as cache miss and hit rates is essential for optimizing the execution of the program.

The prior art profiler also has trouble collecting profiling information about nested loops with common exit points. In these cases, the prior art profiler just discontinued operation and informed the user that these loops could not be profiled. Thus, the user had no way of knowing how much time these loops would take for execution, and had no way of determining any statistics about these loops. This is a serious problem because many loops in programs are loops which have common exits. One of the most common loops that users write is a loop that includes an error statement, i.e. go to error, which removes the control from a loop nest and sends it to a different place in the program. These loops could not be profiled by the prior art profiler using the prior art technique.

Another problem is the manner in which the profiler attempts to collect information about loops. Namely, the profiler changes the way in which the loop executed. Meaning that the prior art profiling technique used to collect information about the loop has altered the loop, and thus skews the collected information. One way the profiler skews the information is that it changed the time of execution for the loop. The profiler also changes the behavior of the instruction cache, because it places the instructions inside the loop. This changes the behavior of the instruction cache, because these instructions have to be loaded into the cache and then purged, depending on the cache replacement algorithm that is used by the processor.

When programs are executed, instructions are brought in from the main memory and then executed. In order to speed up the programs, a faster memory, called cache, is placed between the CPU and the main memory. Typically, a cache memory is comprised of SRAM and is fairly small in size. Usually cache is about 1K or 2K in size, as opposed to main memory which is typically about 1 or 2 gigabytes in supercomputers. In order to further increase the speed of the programs, different kinds of cache replacement algorithms are used. When the CPU wants to execute instructions from the main memory, it brings the instructions from the main memory into the cache, and then it executes those instructions. Now, since cache is really fast, the computer can retrieve the instructions from the cache into the CPU very quickly and then execute those instructions. In comparison, if the computer retrieves the instructions from the main memory, then it takes much longer to execute the instructions.

Typically, programs execute instructions in a tight loop and when the instructions are repeatedly executed, then it is more efficient to have the sequence of instructions stored in the cache, instead of in the main memory, and consequently this speeds up the execution of the program. However, if the sequence of instructions that is being executed by the CPU is really large in size, for example greater than 1K which is the typical size of the cache, then the computer will not be able to reuse any of the instructions that are loaded into the cache. This is because instructions would have to be purged from the cache to make room for subsequent instruction to be loaded, as this is extremely inefficient. Thus, when the profiler places instrumentation instructions inside the loop, then the number of instructions inside the loop will increase to such an extent that the loop instruction sequence might be larger than the cache size. This means that the loop cannot fit into the cache, and then each instruction that is to be executed must be retrieved from the main memory, thereby increasing the time for which the program is executing. Thus, the prior art profiler would increase the size of the loop that is being profiled such that it would not fit in cache memory, and consequently must be stored in main memory. Since main memory is significantly slower than cache memory, the prior art profiler does not determine an accurate time of execution of the loop.

In order to determine characteristics about the loops, the compiler would use standard algorithms to recognize loops, such as an algorithm known as interval analysis. Interval analysis determines the entry and exit points of the loop. In order to collect information about the loops, the prior art profiler will place some instrumentation slots at entry points in the loop, so that the profiler will know that a particular loop has been entered. Also, the profiler will place instrumentation slots at the exit points which will allow the profiler to decide whether the loop has been exited or not. The placement of these instrumentation slots is very critical because these instrumentation slots are the places wherein control enters and exits the loop and profiler collects information about the loop.

The prior art technique only works for loops with a single entry point and either a single or multiple exit points. This is because the technique is derived from function level profiling and functions have only one entry point and one exit point. The instrumentation slots are placed just before the entry point of the function and then just after the exit point of the function to indicate that control has entered the function and control has exited the function. This technique was adapted for collection information for the loops. However, loops are more difficult to collect information than functions, because loops can typically have multiple entry points and multiple exit points unlike functions.

Thus, the prior art profiler and profiling techniques subvert the collected information by changing the behavior and characteristics of the loops. Moreover, the prior art profiler and profiling technique cannot profile many types of loops, particularly loops that have multiple entry points or nested loops with common exits.

SUMMARY OF THE INVENTION

These and other objects, features and technical advantages are achieved by a system and method which can collect information about many different types of loops, without significantly impacting the behavior of the loops. The different types of loops can be nested loops, loops with a common exit, loops with multiple entry points, and loops with multiple exit points. This invention works equally well for collecting information about all these different types of loops or any combinations thereof. The invention operates by placing the instrumentation slots at every entry point for the loop and also at every exit point for the loop, but places the slots outside the loop body. The invention also changes the way in which the branches are taken out of the loop at the exit points and the way branches are taken into the loop at the entry points. Thus, by placing the instrumentation slots at the entry points and exit points outside the loop, the performance of the loop is not impacted in any way, and consequently, accurate information about the loop execution can be readily determined.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

To assist in understanding the invention it is considered useful to review the prior art profiler technique and how it places instrumentation slots into the computer code.

Figure 1:
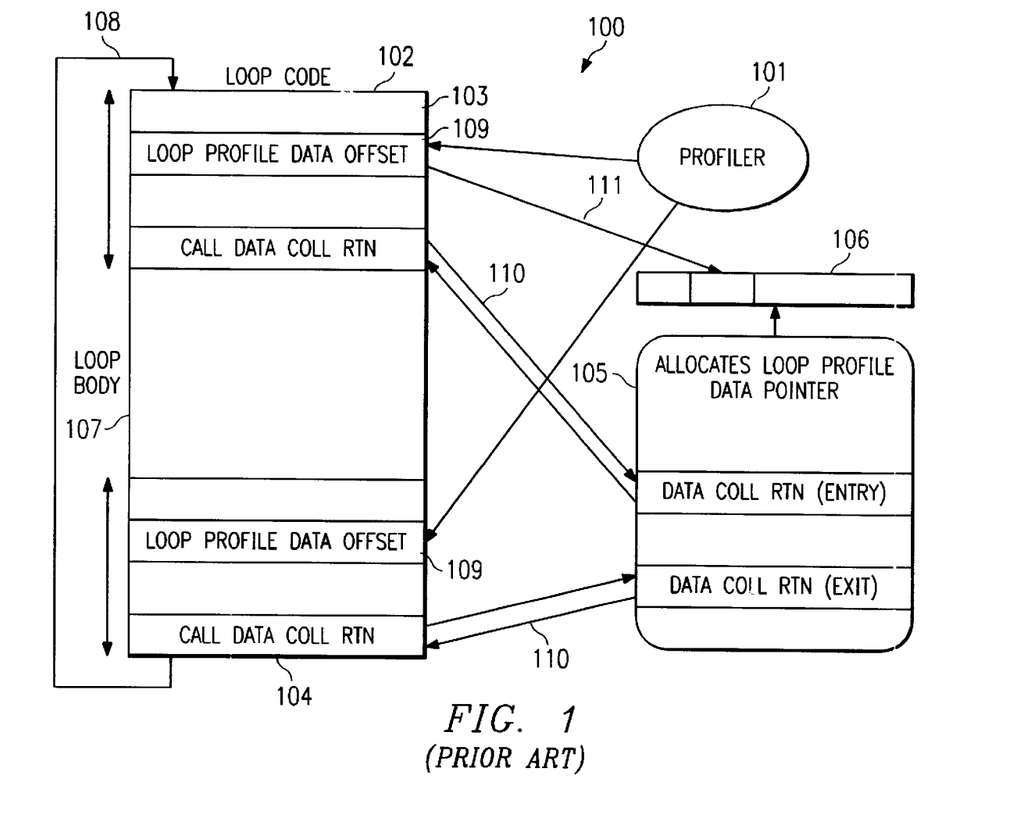
FIG. 1 depicts a model of the prior art profiler technique.

FIG. 1 depicts a model of the prior art profiler technique 100. The compiler represents a program loop as loop code 102. To profile this section of code, profiler 101 places an entry instrumentation code 103 just before body loop 107, but after the entry point of loop code 102, and places an exit instrumentation code 104 just after body loop 107, but before the exit point of loop code 102. When profiler 101 wants to collect information about this loop, profiler 101 places instructions in the instrumentation slots 109, which identify the particular loop that is to be entered or exited. Profiler 101 collects information by allocating data pointer 105 to hold the data about the loop. Arc 110 indicates the transfer of control between the instrumentation slots and the profiling routine that collects profiling data about the program construct under consideration. Those leading from loop code 102 indicate control being transferred to the data collection routine, and those leading to loop code 102 indicate control being transferred back to the instrumentation slots. Arc 111 indicates that the data is being returned from the instrumentation slots into the profile data area of the profiler. All this data is placed in some memory or register area 106 and which is under the control of profiler 101.

In this prior art technique, loop code 102, which includes entry instrumentation code 103 and exit instrumentation code 104 is considered to be the loop. The programmer originally wrote only loop body 107, but profiler 101 has added entry code 103 and exit code 104, and also has added branch 108 at the end of loop code 102, which runs from exit code 104 to entry code 103. Thus, profiler has significantly changed the loop, such that the whole of loop code 102 is considered to be the loop for execution purposes. Consequently, this entire sequence of code would have to fit inside the cache for the loop to be stored inside the cache for execution. Notice that loop body 107 is much smaller than loop code 102. While loop body 107 may have fit into the cache, loop code 102 may be too large to fit, and therefore, upon execution, the program, as changed by profiler 101, may hit cache misses, and any information collected by profiler about the loop would be inaccurate.

A loop is a structure in the control flow graph of the program. A loop is typically characterized by its entry points and exit points. An entry point is a place in the loop where control can enter from outside the loop. For example, in FIG. 2A point L1 201 is an entry point of loop 200. An exit point of a loop is a place in the loop where the control can flow out of the loop and point EX1 202 is the exit point out of the loop. Loop 200 comprises the code between L1 201 and IM1 203. Moreover, notice that EX1 202 has a branch to point E1 204 which exists outside loop 200, thus, EX1 202 is considered to be an exit point. There are several suitable standard algorithms to detect where the entry points and the exit points are in the loop.

Now, in order to collect the profiling information about loops, certain conditions have to be satisfied by the instrumentation slots that are placed at the entry points and at the exit points. The first condition that must be satisfied is that the execution of the entry instrumentation code for the loop will always be followed by the execution of the exit instrumentation code of the loop. The second condition that must be satisfied is that the exit instrumentation code of the loop is never executed before its entry instrumentation code is executed. The third condition that must be satisfied is that only one exit instrumentation code is executed after the execution of the entry instrumentation code of the loop. These three design criteria must be following in the placement of the entry and the exit instrumentation slots.

An entry point is a point either at the start of the loop or inside the loop, where control can be transferred to it from at least one point outside the loop. There may be multiple entry points in the loop. For example, in FIG. 3A the instructions at points L1 301 and L3 302 are loop entry points. These loop entry points would be detected by using the standard algorithms that are present in the compiler.

In order to place the instrumentation slots for entry points of loops the following rules are used. Entry Rule 1: The required number of entry instrumentation slots are introduced into the loop just before the entry point of the loop. Entry Rule 2: The target of every branch instruction outside the loop is changed to point to the first instruction of the entry instrumentation code. Entry Rule 3: And then, if there is a fall through from inside the loop to an entry point of the loop, then a branch instruction is placed before the first instruction of the entry instrumentation code, which branches around the entry instrumentation code. This is needed to prevent the execution of the entry instrumentation code when control flows to an entry point of the loop from inside the loop.

The number of instrumentation slots that is required can vary depending on the profiler that is being used, and also the different types of information that the profiler wants to collect about the loop. For example, the number of required slots may be different for the collection information about the execution time of the program than for collection of information about the total number of cache misses or cache hits inside a loop.

Figure 3A:
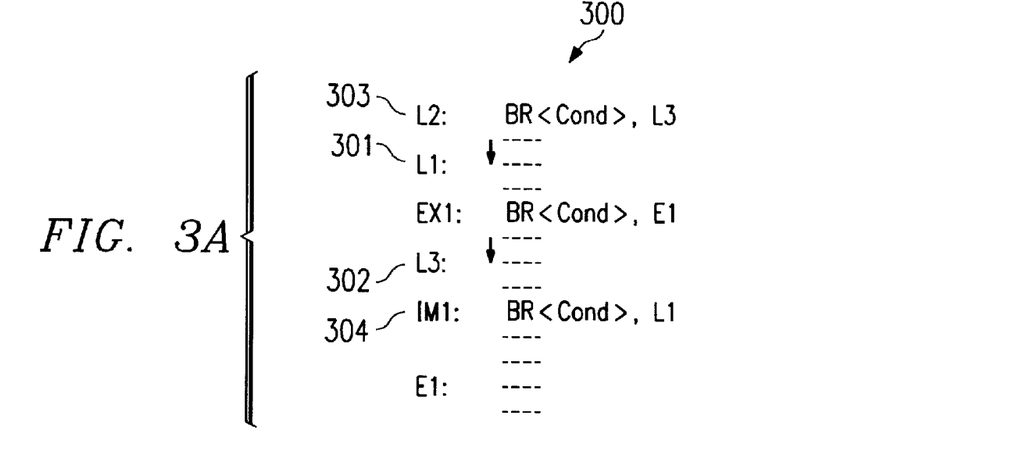
FIG. 3A depicts a section of code with a loop having two entry points.

A fall through is the transfer of control from one instruction to the next instruction. Note that a transfer of control can happen without a fall through by means of a branch instruction which explicitly changes the control to a location in the program, which is specified as part of the branch instruction. As shown in FIG. 3A, point L2 303 is a branch instruction, which is outside loop 300, that transfers control to entry point L3 302 in the program. Also, there is a fall through from inside the loop to entry point L3 302. Control is transferred to entry point L1 301 via a fall through from outside the loop. Loop 300 comprises the code between L1 301 and IM1 304.

Figure 3B:
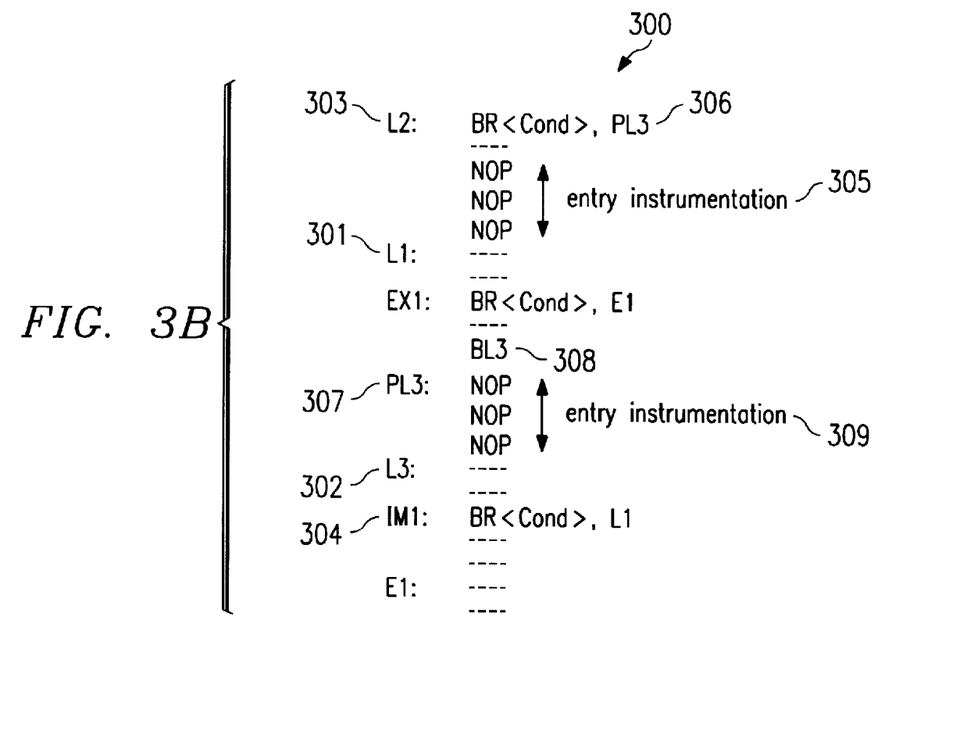
FIG. 3B depicts the code of FIG. 3A after the implementation of instrumentation placement rules for loop entry points.

FIG. 3B depicts the code of FIG. 3A after the instrumentation placement rules for loop entry points have been followed. According to entry rule 1, instrumentation slots 305 and 309 have been placed before entry points L1 301 and L3 302, respectively. According to entry rule 2, the target, which was L3, as shown in FIG. 3A, of branch instruction L2 303, is changed to pointer PL3 306, which points to the first instruction of the entry instrumentation code 307 of that target entry point. According to entry rule 3, branch instruction B L3 308 is placed in front of an internal fall through to entry point L3 302 that branches to L3 302, thus avoiding the execution of the entry instrumentation slots 309.

Notice that the loop instrumentation slots 305 are placed outside the loop and therefore these slots do not affect the instruction cache misses or cache hits. However, instrumentation slots 309 are placed inside the loop, and these are required because L3 302 is an entry point that is present inside the loop.

Figure 2A:
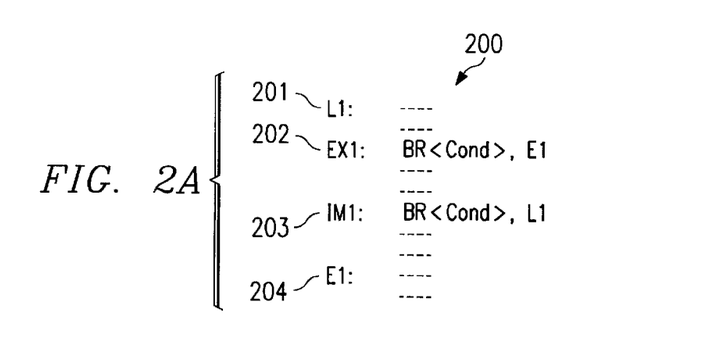
FIG. 2A depicts a section of code with a loop having an implicit exit point and an explicit exit instruction.

There are two types of exit points, implicit exits and explicit exits. Implicit exits are the exits where the failure of the branch instruction causes the control to exit out the loop. For example, in FIG. 2A, IM1 203 is an implicit exit. Therefore, by definition, there can only be one implicit exit in a loop. The other kind of exit is the explicit exit and these are the exits where the instruction explicitly transfers the control out of the loop, so typically this is a branch instruction. In FIG. 2A the instruction at point EX1 202 is an explicit exit.

In order to place the instrumentation slots for exit points of loops the following rules are used. Implicit exit rule: Instrumentation slots are added immediately subsequent to an implicit exit. Explicit exit rule 1: Instrumentation slots are added at the target of the exit instruction. Explicit exit rule 2: If there is a fall through from the instruction before the target of the exit to the target of the exit, then a branch which skips the instrumentation code is added before the first instruction of the instrumentation code. Explicit exit rule 3: The target of exit instruction is changed to point to the start of the exit instrumentation code.

Figure 2B:
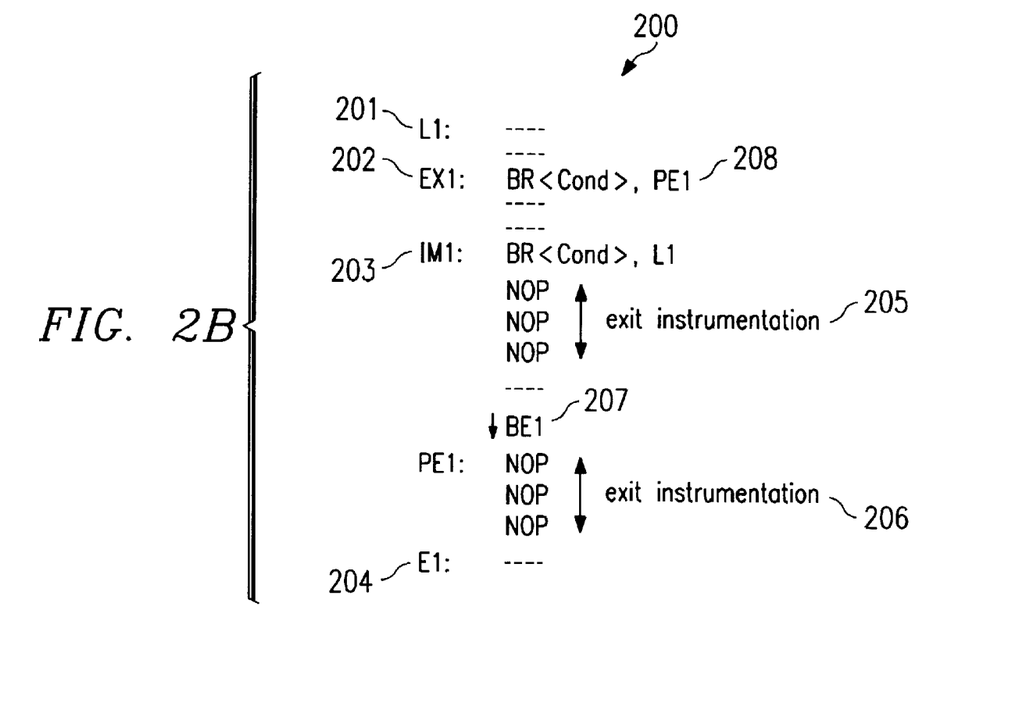
FIG. 2B depicts the code of FIG. 2A after the implementation of instrumentation placement rules for loop exit points.

FIG. 2B depicts the code of FIG. 2A after the instrumentation placement rules for loop exit points have been followed. According to the implicit exit rule, instrumentation code or slots 205 have been placed after implicit exit IM1 203. According to explicit exit rule 1, instrumentation code or slots 206 has been placed at target E1 204 of the exit instruction EX1 202. According to explicit exit rule 2, branch instruction B E1 207 is placed in front of an internal fall through to target E1 204 of exit instruction EX1 202 that branches to E1 204, thus avoiding the execution of the entry instrumentation slots 206. According to explicit exit rule 3, the target of exit instruction EX1 202 is changed to pointer PE1 208 that points to the start of exit instrumentation code 206.

Notice that exit instrumentation slots 205 and 206 are outside loop 200. Thus, the slots do not pollute the cache when this loop is being executed.

Figure 4A:
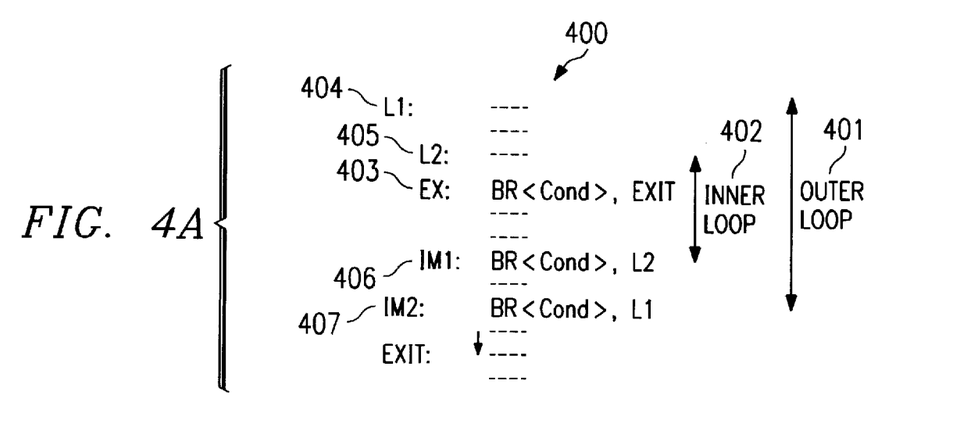
FIG. 4A depicts a section of code with nested loops.

FIG. 4A depicts nested loop 400 with outerloop 401 and inner loop 402. Loop 400 also contains an exit point 403 which takes the control out of the whole loop nest 400, that is both of the loops are exited with a single exit. Inner 402 and outer 401 loops contain only single entry points, L1 404 and L2 405, respectively. Since there are two loops, there can be only two implicit exits out of the loops, namely IM1 406 for inner loop 402 and IM2 407 for outer loop 401. Loop 406 comprises the code from L1 404 to IM2 407.

Figure 4B:
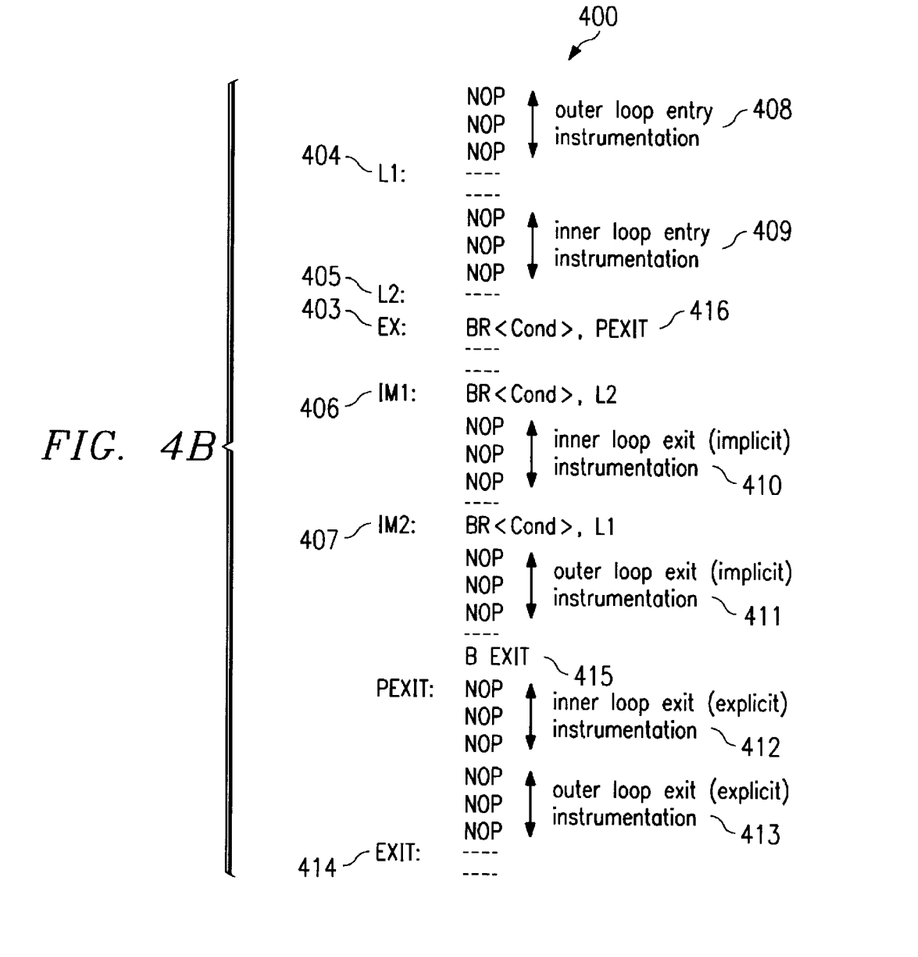
FIG. 4B depicts the code of FIG. 4A after the implementation of instrumentation placement rules for loop entry and exit points.

FIG. 4B depicts the code of FIG. 4A after the instrumentation placement rules for loop entry points and loop exit points have been followed. According to entry rule 1, instrumentation slots 408 and 409 have been placed before entry points L1 404 and L2 405, respectively. According to the implicit exit rule, instrumentation code or slots 410 and 411 have been placed after the implicit exits IM1 406 and IM2 407, respectively. According to explicit exit rule 1, instrumentation code or slots 412 and 413 have been placed at the target EXIT 414 of the exit instruction EX 403. There are two sets of slots because both loops are exited with this instruction. According to explicit exit rule 2, branch instruction B EXIT 415 is placed in front of an internal fall through to target EXIT 414 of exit instruction EX 403 that branches to EXIT 414, thus avoiding the execution of the entry instrumentation slots 412 and 413. According to explicit exit rule 3, the target of exit instruction EX 403 is changed to pointer PEXIT 416 that points to the start of the exit instrumentation code 412. Thus, the exit instrumentation code or slots will be executed only when entered from the exit instruction.

Figure 5A:
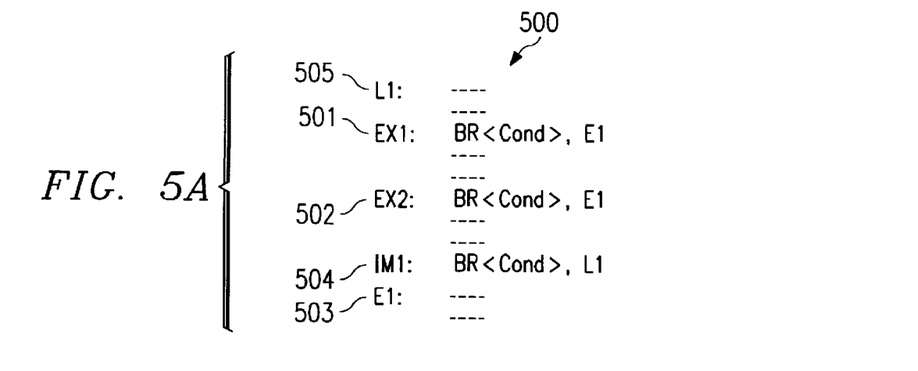
FIG. 5A depicts a section of code with a loop having multiple explicit exit instructions with a common target.

FIG. 5A depicts loop 500 with multiple exit points exiting to the same target. There two explicit exit points, EX1 501 and EX2 502, that both branch to the same exit point E1 503, which is outside the loop. There is also implicit exit point IM1 504. Loop 500 also has one entry point L1 505. Loop 500 comprises the code from L1 505 to IM1 504.

Figure 5B:
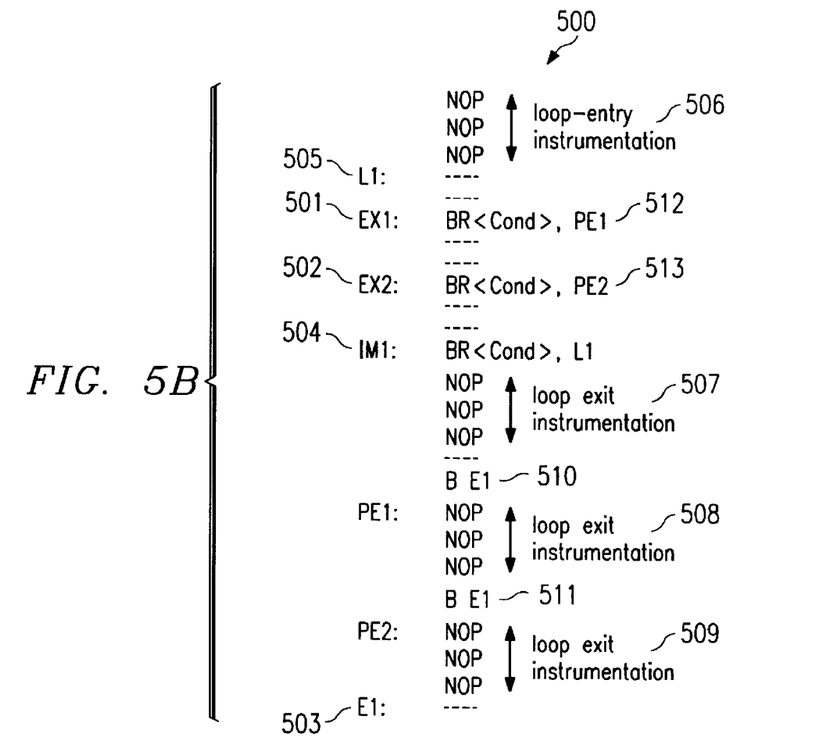
FIG. 5B depicts the code of FIG. 5A after the implementation of instrumentation placement rules for loop entry and exit points.

FIG. 5B depicts the code of FIG. 5A after the instrumentation placement rules for loop entry points and loop exit points have been followed. According to entry rule 1, instrumentation slots 506 have been placed before entry point L1 505, According to the implicit exit rule, instrumentation code or slots 507 have been placed after implicit exit IM1 504. According to explicit exit rule 1, instrumentation code or slots 508 and 509 have been placed at target E1 503 of exit instructions EX1 501 and EX2 502. There are two sets of slots because this exit point is exited with by two exit instructions. According the explicit exit rule 2, branch instruction B E1 510 is placed in front of an internal fall through to target E1 503 of exit instruction EX1 501 that branches to E1 503, thus avoiding the execution of entry instrumentation slots 508. According to explicit exit rule 2, branch instruction B E1 511 is placed in front of an internal fall through to target E1 503 of exit instruction EX2 502 that branches to E1 503, thus avoiding the execution of the entry instrumentation slots 509. According to explicit exit rule 3, the target of exit instruction EX1 501 is changed to pointer PE1 512 that points to the start of exit instrumentation code 508. According to explicit exit rule 3, the target of exit instruction EX2 502 is changed to pointer PE2 513 that points to the start of exit instrumentation code 509.

Figure 5C:
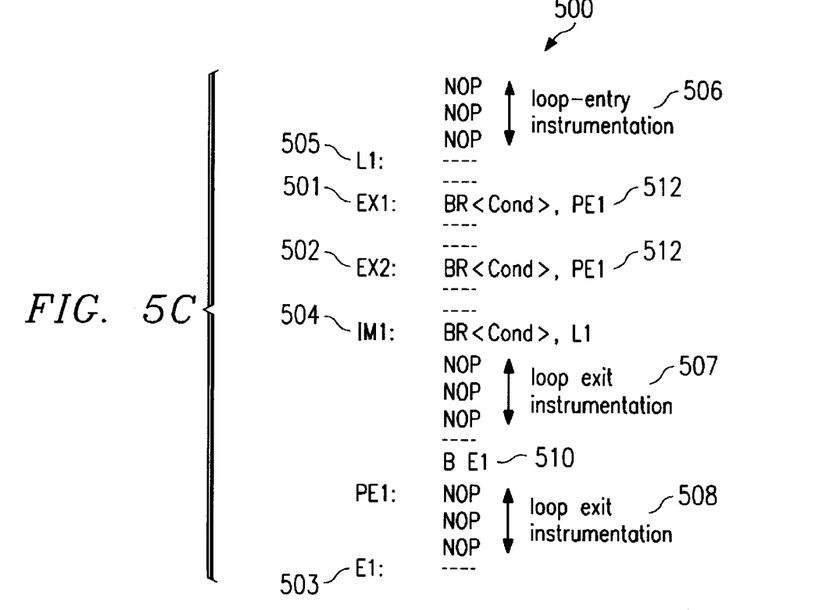
FIG. 5C depicts the code of FIG. 5B after the implementation of refinement to the instrumentation placement rules.

A careful examination of the loop in FIG. 5B, will result with the observation that the instrumentation code 509 at PE2 is unnecessary, and explicit exit at EX2 can be changed to branch to PE1 and still yield the same effect. Thus, instrumentation slots 509, branch instruction B E1 511, and target pointer PE2 513 are all redundant. Only one set of instrumentation slots 508, along with attendant branch instruction B E1 510, and target pointer PE1 512 are necessary. To achieve this, the list of exit targets that were replaced at any instance are remembered during replacement, a new target that needs to be replaced is compared to the list, to see if a target has already been handled by a previous explicit exit instruction. This will result in code that is smaller and more efficient. This is shown in FIG. 5C, which shows that explicit exits EX1 501 and EX2 502 both have pointer PE1 512 branch to the same exit instrumentation code 508. If this is present inside an inner loop, then this refinement is very important because it reduces the size of the inner loop which may allow it to fit into the cache.

In comparison with the prior art, the prior art technique would have placed the instrumentation inside the loop, after L1 505, and prior to exit points EX1 501 and EX2 502. Thus, the inventive technique eliminates instruction slots from inside the loop. The prior art would also have replaced exit instructions EX1 501 and EX2 502 with not-condition branches prior to the exit instrumentation slots inside the loop, and inserted branches to exit target E1 503 after the exit instrumentation slots. Therefore, the prior art inserts two branch instruction for each exit instruction. Thus, the inventive technique also reduces the total number of branches that are taken in exiting out of the loop, as the prior art would have two branches, and the inventive technique places only one branch that is outside of the loop. Thus, the inventive technique reduces the time to collect information.

Although the present invention and its advantages have been described in detail, it should be understood that various changes, substitutions and alterations can be made herein without departing from the spirit and scope of the invention as defined by the appended claims.

What is claimed is:

1. A method for placing entry instrumentation slots into a section of program code to prepare a loop within the section for profiling, wherein at least one entry point of the loop has been determined, the method comprising the steps of:

inserting a predetermined number of entry instrumentation slots prior to the entry point of the loop;

changing a target of a branch instruction that is located outside of the loop to point to a first instruction of the entry instrumentation slots if the target is within the loop; and inserting a branch instruction before the first instruction of the entry instrumentations slots to branch around the entry instrumentation slots, if there is a fall through from within the loop to the entry instrumentation slots.

2. The method of claim 1, wherein:

the predetermined number of entry instrumentations slots are inserted immediately prior to the entry point.

3. The method of claim 1, wherein the at least one entry point of the loop has been determined to be a plurality of entry points of the loop, and the method further comprises the step of:

inserting a predetermined number of entry instrumentation slots prior to each entry point of the plurality of entry points of the loop.

4. The method of claim 1, further comprising the step of:

determining the predetermined number of instrumentation slots according to a type of information being collected about the loop and a type of profiler being used to collect the information.

5. The method of claim 1, further comprising the steps of:

placing exit instrumentation slots into the section of program code; and collecting information about the loop.

6. The method of claim 5, wherein:

the information comprises an execution time of the loop.

7. The method of claim 5, wherein:

the information comprises a cache hit rate and a cache miss rate for the loop.

8. A method for placing exit instrumentation slots into a section of program code to prepare a loop within the section for profiling, wherein an implicit exit point and at least one explicit exit instruction which has a target that is outside of the loop have been determined, the method comprising the steps of:

inserting a predetermined number of first exit instrumentation slots subsequent to the implicit exit point of the loop;

inserting a predetermined number of second exit instrumentation slots prior to the target of the explicit exit instruction;

inserting a branch instruction before a first instruction of the second exit instrumentations slots to branch around the second exit instrumentation slots, if there is a fall through within the section to the second exit instrumentation slots; and changing the target of the explicit exit instruction to point to the first instruction of the second exit instrumentation slots.

9. The method of claim 8, wherein:

the predetermined number of first exit instrumentations slots are inserted immediately subsequent to the implicit exit point.

10. The method of claim 8, wherein the at least one explicit exit instruction has been determined to be a plurality of explicit exit instructions, and the method further comprises the step of:

inserting a predetermined number of second exit instrumentation slots prior to each target of each explicit exit instruction of the plurality of explicit exit instructions of the loop.

11. The method of claim 8, further comprising the step of:

determining the predetermined number of first and second instrumentation slots according to a type of information being collected about the loop and a type of profiler being used to collect the information.

12. The method of claim 8, further comprising the steps of:

placing entry instrumentation slots into the section of program code; and collecting information about the loop.

13. The method of claim 12, wherein:

the information comprises an execution time of the loop.

14. The method of claim 12, wherein:

the information comprises a cache hit rate and a cache miss rate for the loop.

15. The method of claim 8, wherein the loop has at least two explicit exit instructions which reference a common target, the method further comprising the steps of:

removing redundant exit instrumentation slots.

16. The method of claim 15, further comprising the steps of:

storing a list of targets replaced by the step of changing the target;

comparing each target with the list to determine if each target is on the list; and designating exit instrumentation slots as redundant, if the target immediately following the exit instrumentation slots is on the list.

17. A method for preparing a loop within a section of program code for profiling, wherein at least one entry point and an implicit exit point of the loop have been determined, the method comprising the steps of:

inserting a predetermined number of entry instrumentation slots prior to the entry point of the loop; and inserting a predetermined number of first exit instrumentation slots subsequent to the implicit exit point of the loop.

18. The method of claim 17, wherein the section includes a branch instruction that is located outside of the loop and has a target inside of the loop, the method further comprising the step of:

changing the target of the branch instruction to point to a first instruction of the entry instrumentation slots.

19. The method of claim 17, wherein the loop has a fall through to the entry instrumentation slots, the method further comprising the step of:

inserting a branch instruction before the first instruction of the entry instrumentations slots to branch around the entry instrumentation slots.

20. The method of claim 17, wherein:

the predetermined number of entry instrumentations slots are inserted immediately prior to the entry point; and the predetermined number of first exit instrumentations slots are inserted immediately subsequent to the implicit exit point.

21. The method of claim 17, wherein the at least one entry point of the loop has been determined to be a plurality of entry points of the loop, and the method further comprises the step of:

inserting a predetermined number of entry instrumentation slots prior to each entry point of the plurality of entry points of the loop.

22. The method of claim 17, wherein at least one explicit exit instruction which has a target that is outside of the loop has been determined, the method further comprising the step of:

inserting a predetermined number of second exit instrumentation slots prior to the target of the explicit exit instruction.

23. The method of claim 22, further comprising the step of:

changing the target of the explicit exit instruction to point to a first instruction of the second exit instrumentation slots.

24. The method of claim 23, wherein the loop has at least two explicit exit instructions which reference a common target, the method further comprising the steps of:

removing redundant exit instrumentation slots.

25. The method of claim 24, further comprising the steps of:

storing a list of targets replaced by the step of changing the target;

comparing each target with the list to determine if each target is on the list; and designating exit instrumentation slots as redundant, if the target immediately following the exit instrumentation slots is on the list.

26. The method of claim 22, wherein the section has a fall through to the second exit instrumentation slots, the method further comprising the step of:

inserting a branch instruction before a first instruction of the second exit instrumentations slots to branch around the second exit instrumentation slots.

27. The method of claim 17, wherein a plurality of explicit exit instructions have been determined, each of which has a target that is outside of the loop, the method further comprises the step of:

inserting a predetermined number of second exit instrumentation slots prior to each target of each explicit exit instruction of the plurality of explicit exit instructions of the loop.

28. The method of claim 17, further comprising the step of:

determining the predetermined number according to a type of information being collected about the loop and a type of profiler being used to collect the information.

29. The method of claim 17, further comprising the step of:

collecting information about the loop.

30. The method of claim 29, wherein:

the information comprises an execution time of the loop.

31. The method of claim 29, wherein:

the information comprises a cache hit rate and a cache miss rate for the loop.

32. A system that profiles a loop within a section of program code, wherein at least one entry point and an implicit exit point of the loop have been determined, the system comprises:

means for inserting a predetermined number of entry instrumentation slots prior to the entry point of the loop; and means for inserting a predetermined number of first exit instrumentation slots subsequent to the implicit exit point of the loop.

33. The system of claim 32, wherein the section includes a branch instruction that is located outside of the loop and has a target inside of the loop, the system further comprising:

means for changing the target of the branch instruction to point to a first instruction of the entry instrumentation slots.

34. The system of claim 32, wherein the loop has a fall through to the entry instrumentation slots, the system further comprising:

means for inserting a branch instruction before the first instruction of the entry instrumentations slots to branch around the entry instrumentation slots.

35. The system of claim 32, wherein:

the predetermined number of entry instrumentations slots are inserted immediately prior to the entry point; and the predetermined number of first exit instrumentations slots are inserted immediately subsequent to the implicit exit point.

36. The system of claim 32, wherein the at least one entry point of the loop has been determined to be a plurality of entry points of the loop, and the system further comprises:

means for inserting a predetermined number of entry instrumentation slots prior to each entry point of the plurality of entry points of the loop.

37. The system of claim 32, wherein at least one explicit exit instruction which has a target outside of the loop has been determined, and the system further comprises:

means for inserting a predetermined number of second exit instrumentation slots prior to the target of the explicit exit instruction.

38. The system of claim 37, further comprising:

means for changing the target of the explicit exit instruction to point to a first instruction of the second exit instrumentation slots.

39. The system of claim 38, wherein the loop has at least two explicit exit instructions which reference a common target, the system further comprising:

means for removing redundant exit instrumentation slots.

40. The system of claim 39, further comprising:

means for storing a list of targets replaced by the means for changing the target;

means for comparing each target with the list to determine if each target is on the list; and means for designating exit instrumentation slots as redundant, if the target immediately following the exit instrumentation slots is on the list.

41. The system of claim 37, wherein the section has a fall through to the second exit instrumentation slots, the system further comprising:

means for inserting a branch instruction before a first instruction of the second exit instrumentations slots to branch around the second exit instrumentation slots.

42. The system of claim 32, wherein a plurality of explicit exit instructions have been determined, each of which has a target that is outside of the loop, the system further comprises:

means for inserting a predetermined number of second exit instrumentation slots prior to each target of each explicit exit instruction of the plurality of explicit exit instructions of the loop.

43. The system of claim 32, further comprising:

means for determining the predetermined number according to a type of information being collected about the loop and a type of profiler being used to collect the information.

44. The system of claim 32, further comprising:

means for collecting information about the loop.

45. The system of claim 44, wherein:

the information comprises an execution time of the loop.

46. The system of claim 44, wherein:

the information comprises a cache hit rate and a cache miss rate for the loop.

* * * * *